(12) United States Patent
Kang

(10) Patent No.: US 9,279,906 B2
(45) Date of Patent: Mar. 8, 2016

(54) MICROSTRUCTURE FILM

(75) Inventor: Gary Yih-Ming Kang, Fremont, CA (US)

(73) Assignee: E INK CALIFORNIA, LLC, Fremont, CA (US)

(*) Notice: Subject to any disclaimer, the term of this patent is extended or adjusted under 35 U.S.C. 154(b) by 656 days.

(21) Appl. No.: 13/601,767

(22) Filed: Aug. 31, 2012

(65) Prior Publication Data

US 2014/0065369 A1    Mar. 6, 2014

(51) Int. Cl.
*B32B 37/00* (2006.01)
*G02B 1/00* (2006.01)
*B29D 11/00* (2006.01)
*B32B 3/26* (2006.01)
*G02F 1/167* (2006.01)

(52) U.S. Cl.
CPC ............ *G02B 1/00* (2013.01); *B29D 11/00336* (2013.01); *B29D 11/00788* (2013.01); *B32B 3/26* (2013.01); *G02F 2001/1672* (2013.01); *Y10T 428/24355* (2015.01); *Y10T 428/24372* (2015.01)

(58) Field of Classification Search
CPC ............... B32B 3/26; B29D 11/00336; B29D 11/00788; G02B 1/00
USPC .......... 156/553, 555, 580, 581, 582; 428/141, 428/143
See application file for complete search history.

(56) References Cited

U.S. PATENT DOCUMENTS

| | | | |
|---|---|---|---|
| 6,930,818 B1 | 8/2005 | Liang et al. | |
| 7,604,706 B2 * | 10/2009 | Otokawa et al. | 156/209 |
| 2004/0229018 A1 * | 11/2004 | Graham | B32B 27/32 |
| | | | 428/156 |
| 2006/0262249 A1 | 11/2006 | Liang | |
| 2008/0018021 A1 | 1/2008 | Otokawa et al. | |
| 2010/0129527 A1 | 5/2010 | Ohshima et al. | |

FOREIGN PATENT DOCUMENTS

| | | |
|---|---|---|
| JP | 07-256760 A | 10/1995 |
| JP | 2008-203776 A | 9/2008 |
| WO | WO 01/067170 | 9/2001 |

OTHER PUBLICATIONS

PCT International Search Report, mailed Oct 17, 2013.
Allen, K. (Oct. 2003). Electrophoretics Fulfilled. *Emerging Displays Review: Emerging Display Technologies, Monthly Report* —Oct. 2003, 9-14.
Bardsley, J.N. & Pinnel, M.R. (Nov. 2004) Microcup™ Electrophoretic Displays. *USDC Flexible Display Report*, 3.1.2. pp. 3-12-3-16.
Chaug, Y.S., Haubrich, J.E., Sereda, M. and Liang, R.C. (Apr. 2004). Roll-to-Roll Processes for the Manufacturing of Patterned Conductive Electrodes on Flexible Substrates. *Mat. Res. Soc. Symp. Proc.*, vol. 814, I9.6.1.
Chen, S.M. (Jul. 2003) The Applications for the Revolutionary Electronic Paper Technology. *OPTO News & Letters*, 102, 37-41. (in Chinese, English abstract attached).

(Continued)

*Primary Examiner* — James Sells
(74) *Attorney, Agent, or Firm* — Perkins Coie LLP

(57) ABSTRACT

The present invention is directed to a microstructure film comprising an area of microstructures and two edge areas, wherein the height of the highest part in the edge areas exceeds the height of the highest point in the microstructures, preferably by about 1 μm to about 1 mm. The application also describes how such a film may be manufactured.

6 Claims, 9 Drawing Sheets

(56) References Cited

OTHER PUBLICATIONS

Chen, S.M. (May 2003) The New Application and the Dynamics of Companies. *TRI.* 1-10. (In Chinese, English abstract attached).

Chung, J., Hou, J., Wang, W., Chu, L.Y., Yao, W., & Liang, R.C. (Dec. 2003). Microcup® Electrophoretic Displays, Grayscale and Color Rendition. *IDW*, AMD2/EP1-2, 243-246.

Ho, Andrew. (Nov. 2006) *Embedding e-Paper in Smart Cards, Pricing Labels & Indicators*. Presentation conducted at Smart Paper Conference Nov. 15-16, 2006, Atlanta, GA, USA.

Ho, C., & Liang, R.C. (Dec. 2003). *Microcup® Electronic Paper by Roll-to-Roll Manufacturing Processes*. Presentation conducted at FEG, Nei-Li, Taiwan.

Ho, Candice. (Feb. 1, 2005) *Microcupt® Electronic Paper Device and Application*. Presentation conducted at USDC 4th Annual Flexible Display Conference 2005.

Hou, J., Chen, Y., Li, Y., Weng, X., Li, H. and Pereira, C. (May 2004). Reliability and Performance of Flexible Electrophoretic Displays by Roll-to-Roll Manufacturing Processes. *SID Digest*, 32.3, 1066-1069.

Lee, H., & Liang, R.C. (Jun. 2003) SiPix Microcup® Electronic Paper—An Introduction. *Advanced Display*, Issue 37, 4-9 (in Chinese, English abstract attached).

Liang, R.C. (Feb. 2003) *Microcup® Electrophoretic and Liquid Crystal Displays by Roll-to-Roll Manufacturing Processes*. Presentation conducted at the Flexible Microelectronics & Displays Conference of U.S. Display Consortium, Phoenix, Arizona, USA.

Liang, R.C. (Apr. 2004). *Microcup Electronic Paper by Roll-to-Roll Manufacturing Process*. Presentation at the Flexible Displays & Electronics 2004 of Intertech, San Fransisco, California, USA.

Liang, R.C. (Oct. 2004) *Flexible and Roll-able Displays/Electronic Paper—A Technology Overview*. Paper presented at the METS 2004 Conference in Taipie, Taiwan.

Liang, R.C., & Tseng, S. (Feb. 2003). *Microcup® LCD, A New Type of Dispersed LCD by A Roll-to-Roll Manufacturing Process*. Paper presented at the IDMC, Taipei, Taiwan.

Liang, R.C., (Feb. 2005) *Flexible and Roll-able Displays/Electronic Paper—A Brief Technology Overview*. Flexible Display Forum, 2005, Taiwan.

Liang, R.C., Hou, J., & Zang, H.M. (Dec. 2002) Microcup Electrophoretic Displays by Roll-to-Roll Manufacturing Processes. *IDW*, EP2-2, 1337-1340.

Liang, R.C., Hou, J., Chung, J., Wang, X., Pereira, C., & Chen, Y. (May 2003). Microcup® Active and Passive Matrix Electrophoretic Displays by a Roll-to-Roll Manufacturing Processes. *SID Digest*, vol. 34, Issue 1, pp. 838-841, 20.1.

Liang, R.C., Hou, J., Zang, H.M., & Chung, J. (Feb. 2003). *Passive Matrix Microcup® Electrophoretic Displays*. Paper presented at the IDMC, Taipei, Taiwan.

Liang, R.C., Hou, J., Zang, H.M., Chung, J., & Tseng, S. (Feb. 2003). Microcup® Displays: Electronic Paper by Roll-to-Roll Manufacturing Processes. *Journal of the SID*, 11(4), 621-628.

Liang, R.C., Zang, H.M., Wang, X., Chung, J. & Lee, H., (Jun./Jul. 2004) <<Format Flexible Microcup® Electronic Paper by Roll-to-Roll Manufacturing Process >>, Presentation conducted at the 14th FPD Manufacturing Technology EXPO & Conference.

Nikkei Microdevices. (Dec. 2002) Newly-Developed Color Electronic Paper Promises—Unbeatable Production Efficiency. *Nikkei Microdevices*, p. 3. (in Japanese, with English translation).

Sprague, R.A. (Sep. 23, 2009) SiPix Microcup Electrophoretic Epaper for Ebooks. *NIP 25*, 2009 pp. 460-462. (Presentation conducted on Sep. 23, 2009 at the 25th Int] Conference on Digital Printing Technologies, Digital Fabrication 2009 (NIP 25) by Society for Imaaina Science and Technoloay. In Louisville. Kentucky. USA.).

Wang, X., Kiluk, S., Chang, C., & Liang, R.C. (Feb. 2004). Mirocup® Electronic Paper and the Converting Processes. ASID, 10.1.2-26, 396-399, Nanjing, China.

Wang, X., Kiluk, S., Chang, C., & Liang, R.C., (Jun. 2004) Microcup® Electronic Paper and the Converting Processes. *Advanced Display*, Issue 43, 48-51 (in Chinese, with English abstract).

Wang, X., Li, P., Sodhi, D., Xu, T. and Bruner, S. et al., (Feb. 2006) *Inkjet Fabrication of Multi-Color Microcup® Electrophorectic Display*. The Flexible Microelectronics & Displays Conference of U.S. Display Consortium.

Wang, X., Zang, H.M. and Li, P. (Jun. 2006) Roll-to-Roll Manufacturing Process for Full Color Electrophoretic film. *SID Digest*, 2006, pp. 1587-1589.

Zang, H.M, Hwang, J.J., Gu, H., Hou, J., Weng, X., Chen, Y., et al. (Jan. 2004). Threshold and Grayscale Stability of Microcup® Electronic Paper. *Proceeding of SPIE—IS&T Electronic Imaging, SPIE* vol. 5289, 102-108.

Zang, H.M. & Hou, Jack, (Feb. 2005) *Flexible Microcup® EPD by RTR Process*. Presentation conducted at $2^{nd}$ Annual Paper-Like Displays Conference, Feb. 9-11, 2005, St. Pete Beach, Florida.

Zang, H.M. (Oct. 2003). *Microcup ® Electronic Paper by Roll-to-Roll Manufacturing Processes*. Presentation conducted at the Advisory Board Meeting, Bowling Green State University, Ohio, USA.

Zang, H.M. (Feb. 2004). *Microcup Electronic Paper*. Presentation conducted at the Displays & Microelectronics Conference of U.S. Display Consortium, Phoenix, Arizona, USA.

Zang, H.M. (Sep. 2006) *Monochrome and Area Color Microcup®EPDs by Roll-to-Roll Manufacturing Process*. Presentation conducted at the Fourth Organic Electronics Conference and Exhibition (OEC-06), Sep. 25-27, 2006, Frankfurt, Germany.

Zang, H.M. (Feb. 2007) *Developments in Microcup® Flexible Displays*. Presentation conducted at the 6th Annual Flexible Display and Microelectronics Conference, Phoenix, AZ Feb. 6-8.

Zang, H.M., & Liang, R.C. (2003) Microcup Electronic Paper by Roll-to-Roll Manufacturing Processes. *The Spectrum*, 16(2), 16-21.

Zang, H.M., Wang, F., Kang, Y.M., Chen, Y. and Lin, W. (Jul. 2007) *Microcup® e-Paper for Embedded and Flexible Designs*. IDMC'07, Taipei International Convention Center, Taiwan.

Zang, H.M., Wang, W., Sun, C., Gu, H., and Chen, Y. (May 2006) Monochrome and Area Color Microcup® EPDs by Roll-to-Roll Manufacturing Processes. *ICIS' 06 International Congress of Imaging Science Final Program and Proceedings*, pp. 362-365.

\* cited by examiner

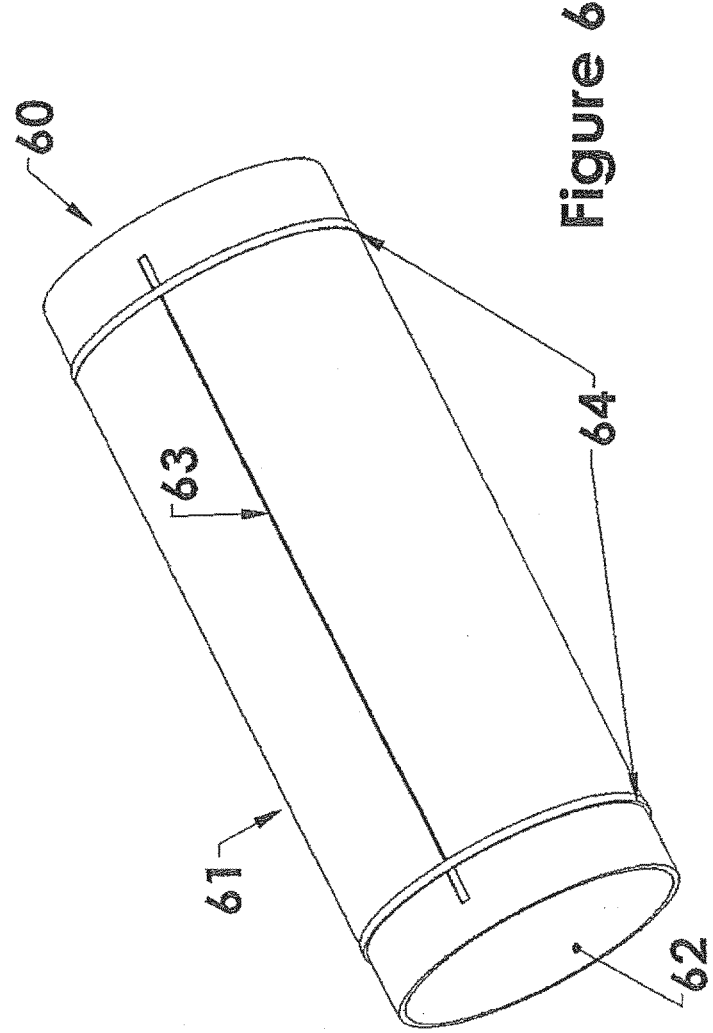

MICROSTRUCTURE FILM

FIELD OF THE INVENTION

The present invention is directed to a microstructure film comprising an area of microstructures and two edge areas outside of the microstructure area and methods for the manufacture of such a film.

BACKGROUND OF THE INVENTION

U.S. Pat. No. 6,930,818 describes how microstructures, such as microcups, may be prepared using an embossing process. The embossing process may be carried out roll to roll using an embossing assembly comprising a rotating drum. There are many advantages of using such a roll to roll process, such as low cost and high yield.

U.S. Pat. No. 6,930,818 also describes how the microcups may be filled with a display fluid which becomes an essential part of a display device.

BRIEF DISCUSSION OF THE DRAWINGS

FIG. 6 depicts an embossing assembly used for the manufacture of the film of FIGS. 5a and 5b.

SUMMARY OF THE PRESENT INVENTION

One aspect of the present invention is directed to a microstructure film comprising an area of microstructures and two edge areas, wherein the height of the highest part in the edge areas exceeds the height of the highest point in the microstructures.

In one embodiment, the height of the highest part in the edge areas exceeds the height of the highest point in the microstructures by about 1 μm to about 1 mm.

In one embodiment, the height of the highest part in the edge areas is the thickness of the thickest part in the edge areas.

In one embodiment, the thickest or highest part in the edge areas is on the same side as the microstructures. In another embodiment, the thickest or highest part in the edge areas is on the opposite side of the microstructures.

In one embodiment, the highest part in the edge areas is a spacer line.

In one embodiment, the spacer line has a width which is in the range of about 3 μm to about 30 mm.

In one embodiment, the microstructures are microcups which may be filled with an electrophoretic fluid comprising charged pigment particles dispersed in a solvent or solvent mixture and sealed with a sealing layer.

Another aspect of the present invention is directed to an embossing assembly for the manufacture of a microstructure film of the present invention, which comprises (a) a drum; and (b) an embossing shim tightly wrapped around the drum wherein the embossing shim has a groove at each end.

A further aspect of the present invention is directed to another embossing assembly for the manufactured of a microstructure film of the present invention, which comprises (a) a drum; (b) an embossing shim tightly wrapped around the drum; (c) a tape laminated around each end of the embossing shim; and (d) a nip roller capable of pressing against the tape and the embossing shim to create spaces for an embossing composition to enter.

DETAILED DESCRIPTION OF THE INVENTION

Figure 1:
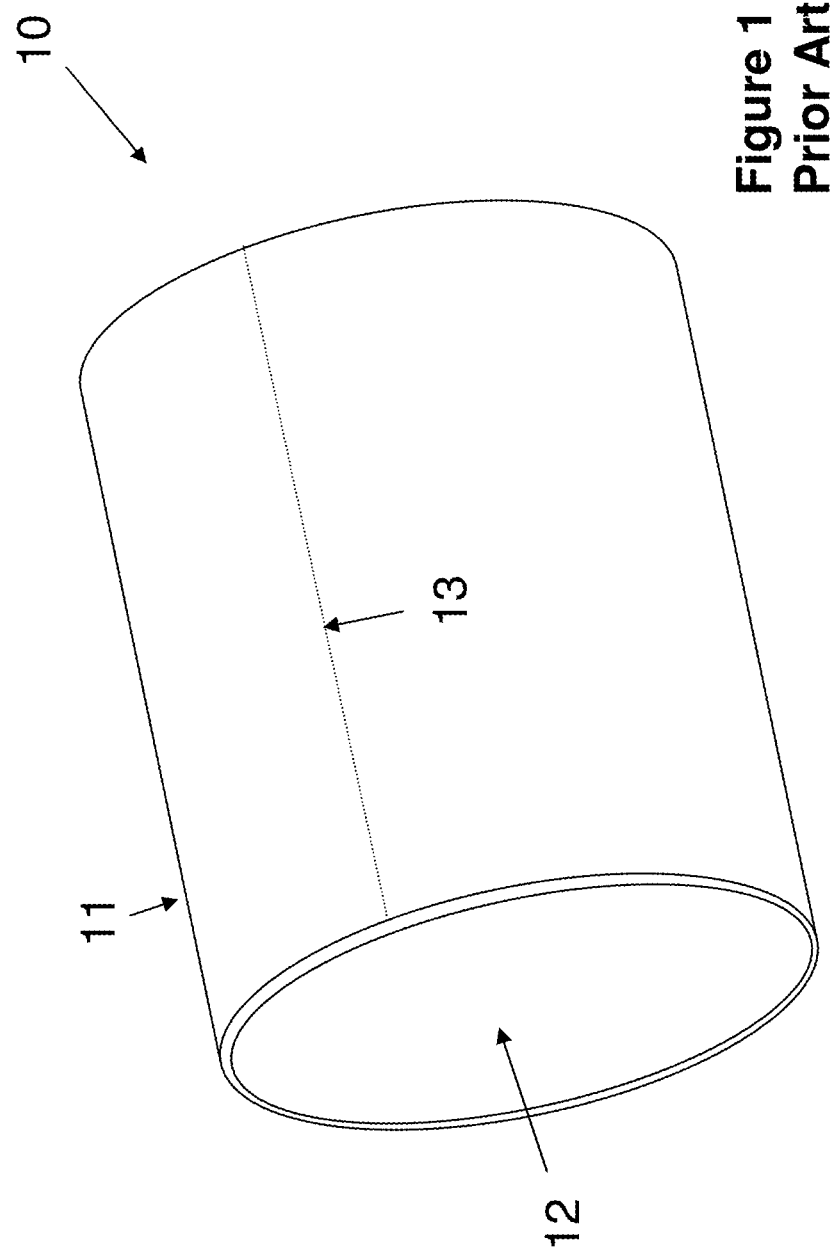
FIG. 1 illustrates a prior art embossing assembly.

FIG. 1 depicts an embossing assembly (10) which may be used in a roll to roll manufacture of a microstructure film. The assembly comprises an embossing shim (11) mounted over a drum (12). The embossing shim, usually formed from an embossing sheet, is securely wrapped around the drum.

Figure 2:
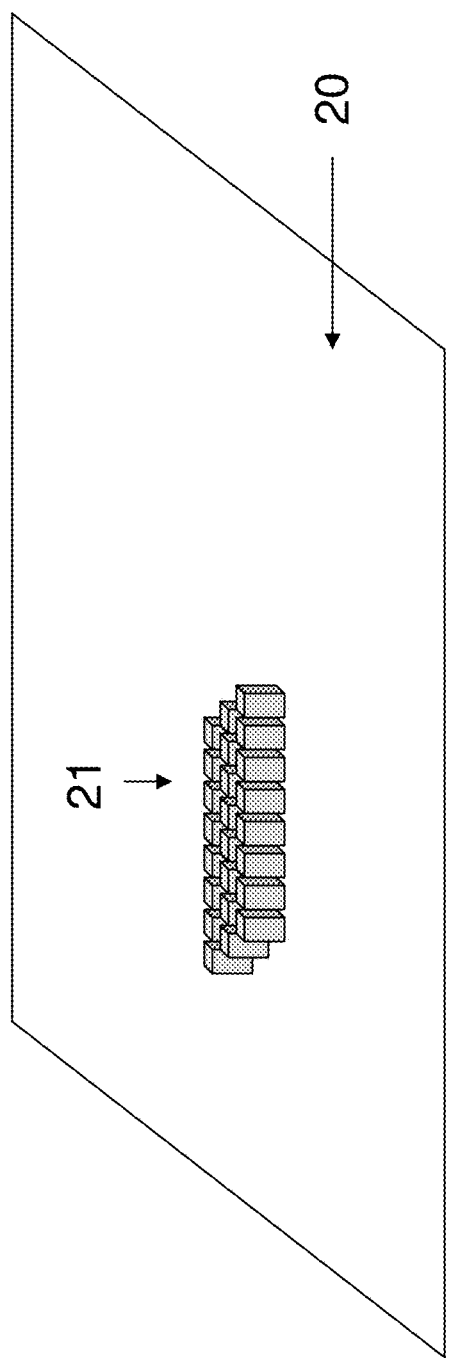
FIG. 2 depicts microposts (i.e., a three dimensional pattern) on a flat sheet which may be mounted on a drum to form an embossing assembly.

The embossing shim has a three-dimensional pattern (21) (e.g., microposts) on one side of the shim (20), as shown in FIG. 2, and the pattern is on the outer surface of the embossing assembly in FIG. 1 when the shim is mounted onto the drum. It is noted that, as a representative, only a few number of the microposts are shown in FIG. 2 and their size is exaggerated for clarity.

Because the embossing shim over the drum is formed from a flat sheet, there is inevitably a seam line (13) on the embossing assembly.

Figure 3:
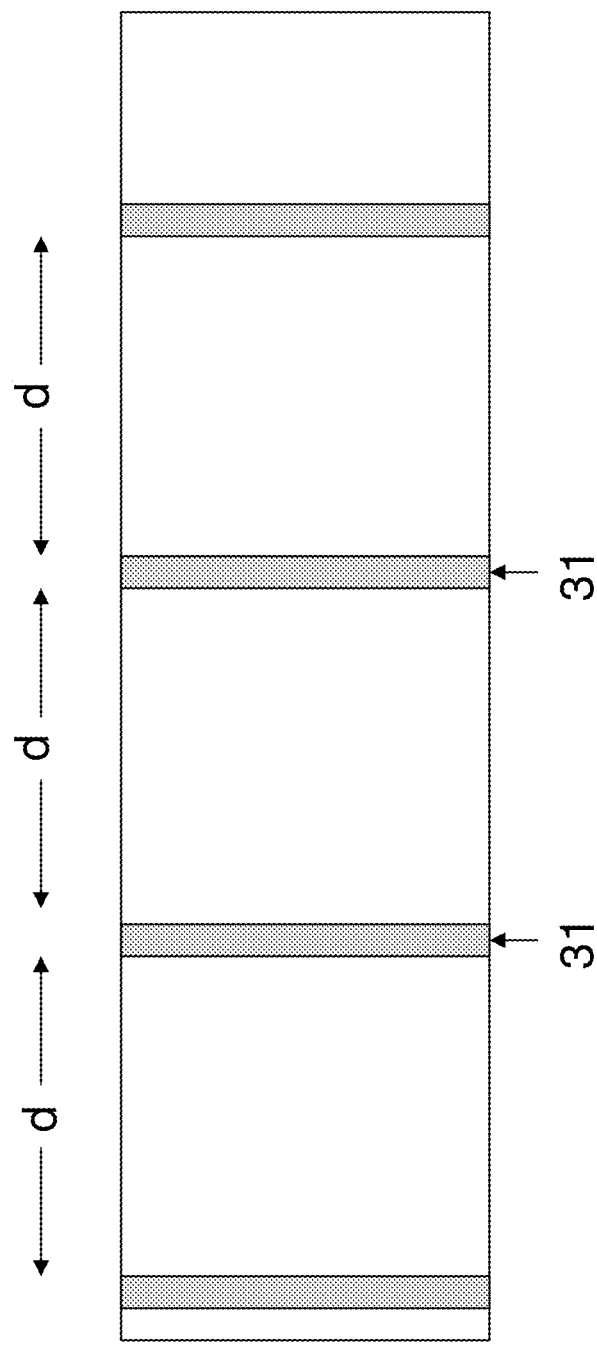
FIG. 3 shows the top view of a film prepared from the embossing assembly of FIG. 1.

The dimensions of the microposts in the region, on or close to the seam line, and the dimensions of the microposts in the other regions may not be uniform. As a result, when such an assembly is used for forming the microstructures, the film produced, at a regular interval, will have areas of microstructures which have irregular dimensions (such as irregular shapes or heights). FIG. 3 is a top view of such a film to illustrate this phenomenon. The distance (d) between the areas (31) having microstructures of irregular dimensions on the film is usually the circumference of the drum.

Figure 4:
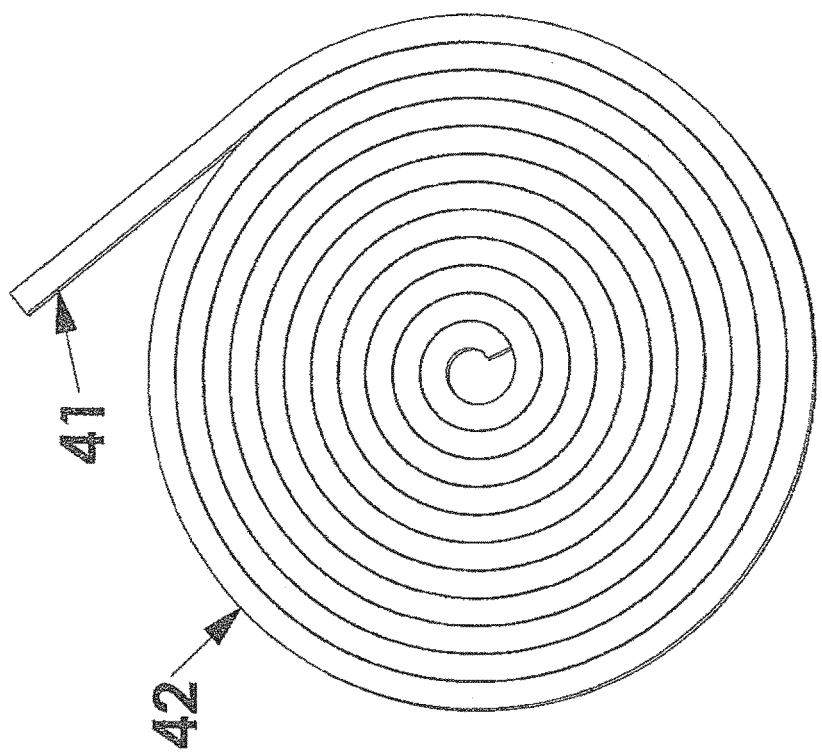
FIG. 4 shows how a microstructure film is rolled.

A film of the microstructures generated by an embossing assembly of FIG. 1, in a roll to roll process, is usually rolled in a manner as shown in FIG. 4 where the microstructures (41) are facing the center (facing inward) of the roll. While it is not shown, it is also possible for the film to be rolled in a manner where the microstructures are facing outward. In either case, the microstructure side (41) will be in contact with the back side (42) of the microstructures in a preceding layer. As a result, the uniformity of microstructures having their backside in contact with the microstructures of irregular dimensions, would be impacted. For example, if the microstructures of irregular dimensions have inconsistent heights, the protruding parts may exert a pressure on the backside of microstructures of normal dimensions in a preceding layer, which could cause the microstructures of normal dimensions to deform.

The present inventors have now design a microstructure film which could eliminate the deformation problem illustrated above. The film comprises an area of microstructures and two edge areas outside of the area of microstructures wherein the height of the highest part in the two edge areas exceeds the height of the highest point in the microstructures, preferably by about 1 μm to about 1 mm.

Figure 5A:
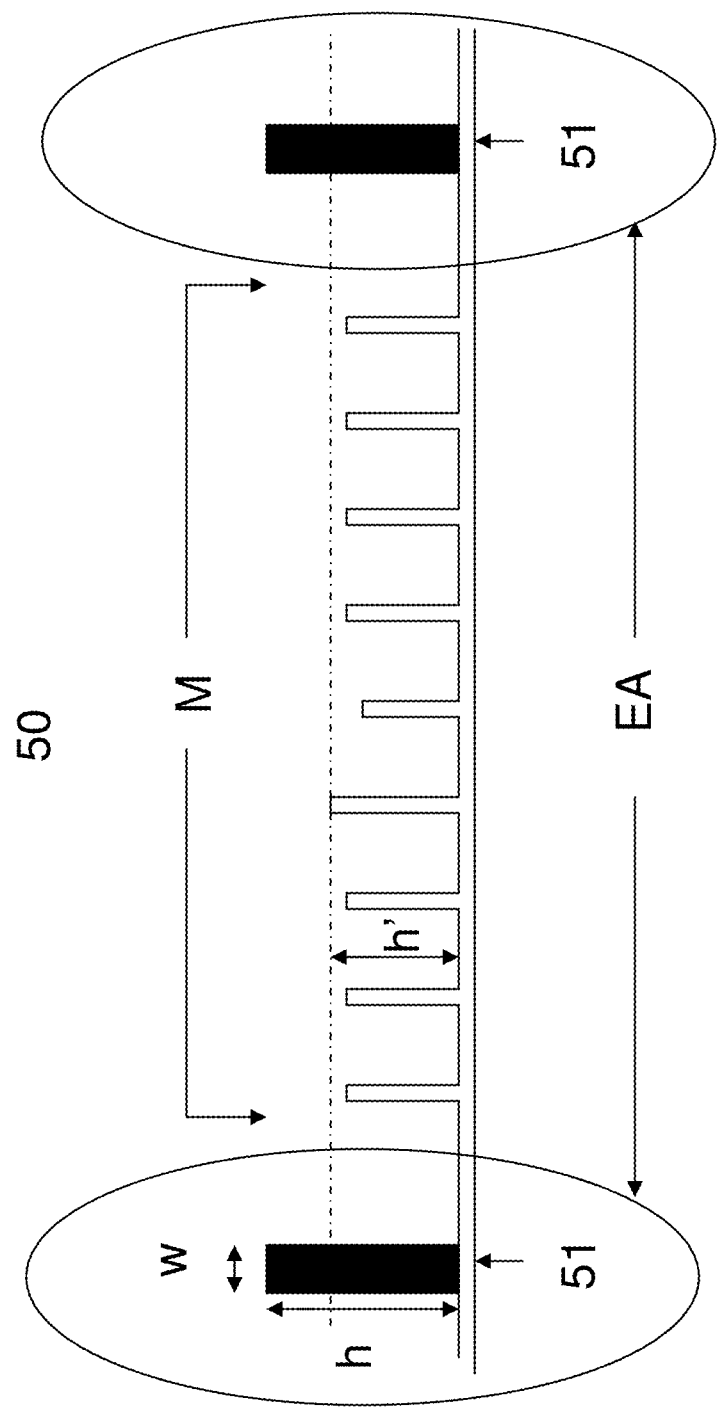
FIG. 5a is a cross-sectional view of a microstructure film of the present invention.
Figure 5B:
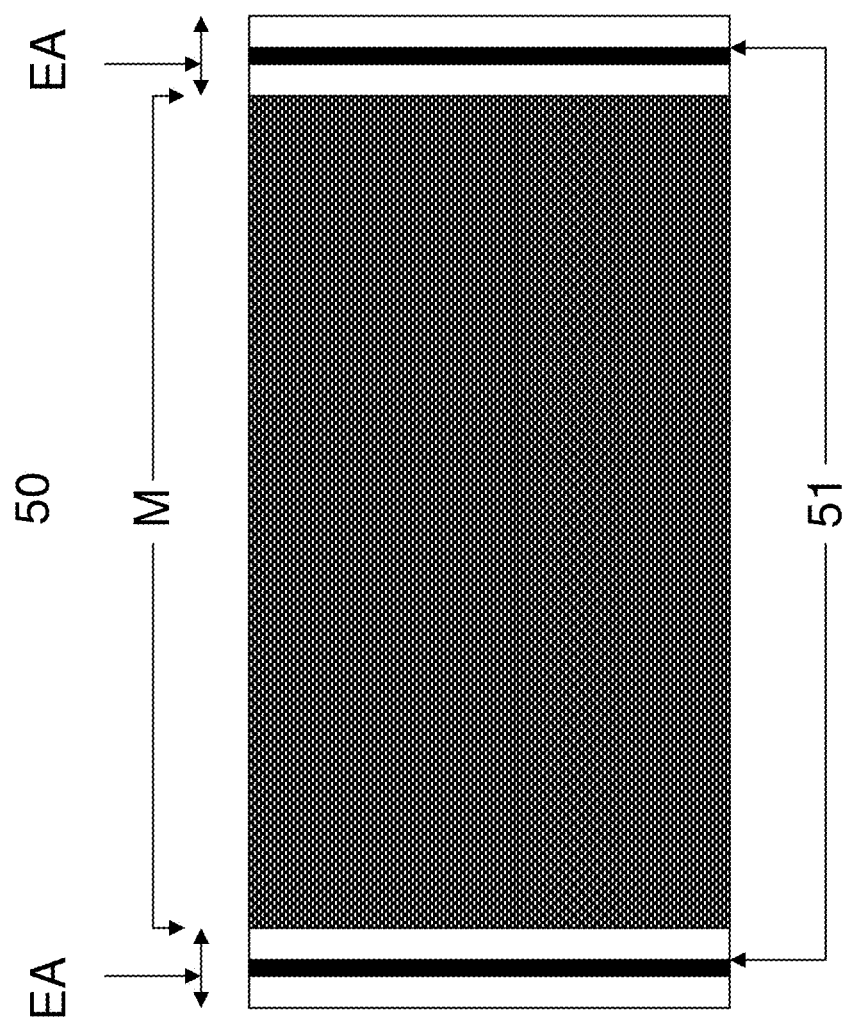
FIG. 5b is a top view of a microstructure film of the present invention.

A film of microstructures of the present invention is shown in FIGS. 5a (cross-sectional view) and 5b (top view).

The film (50) comprises an area of microstructures (M) and two edge areas (EAs) which are outside of the area of microstructures. Each of the edge areas has a spacer line (51). The spacer lines and the microstructures are on the same side of the film. Such spacer lines representing the highest part in the edge areas would prevent layers of microstructures in a roll from being in contact with each other, thus preventing microstructures of normal dimensions from being affected by microstructures of irregular dimensions.

The width (w) of the spacer line (51) in FIG. 5a may be in the range of about 3 µm to about 30 mm, or 10 µm to about 10 mm, or 100 µm to about 1 mm. The height (h) of the spacer line (51) exceeds the height (h') of the highest point in the microstructures, preferably by about 1 µm to about 1 mm, or 10 µm to 100 µm. Both heights are measured from the same base line in the film.

Such a film may be manufactured by an embossing assembly as shown in FIG. 6. This assembly also has an embossing shim (61) mounted on a drum (62) and the embossing shim may have a seam line (63). In this assembly, each of the two edge areas of the embossing shim also has a groove (64). The dimensions of the groove would correspond to the desired dimensions of the spacer line discussed above.

Alternatively, each spacer line may also be achieved by laminating a tape in the edge area. The tape is laminated before the film is being rolled up. The thickness of the tape should be more than the height (h') of the highest point in the microstructures, preferably by about 1 µm to about 1 mm.

Figure 7:
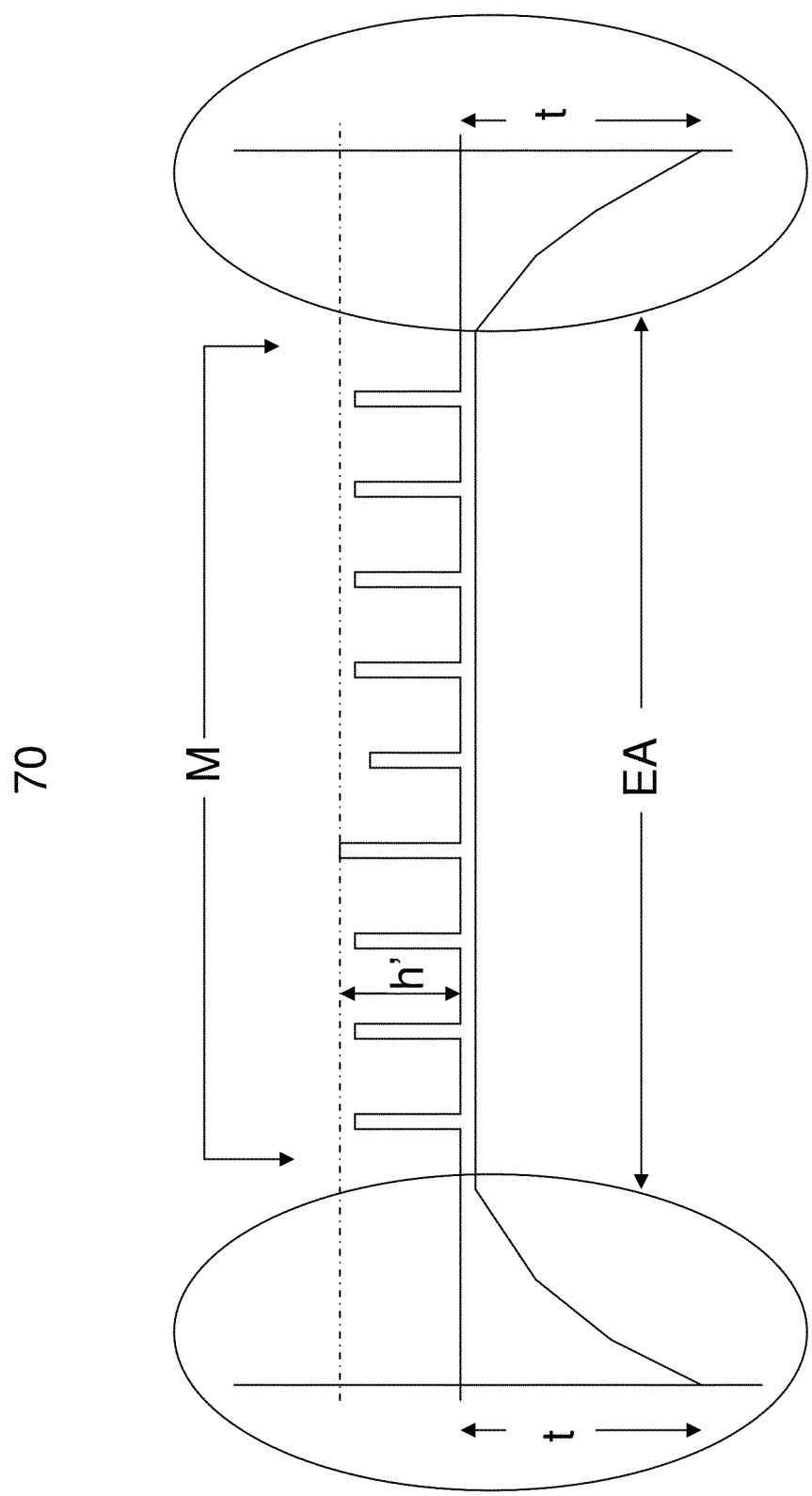
FIG. 7 is a cross-sectional view of an alternative microstructure film of the present invention.

FIG. 7 illustrates an alternative design of the present invention. As shown, a film of microstructures comprises an area of microstructures (M) and two edge areas (EAs) which are outside of the area of microstructures. The highest part in the edge areas and the microstructures are on the opposite sides of the film. The height of the highest part in the edge areas exceeds the height (h') of the highest point in the microstructures, preferably by about 1 µm to about 1 mm. The highest part in the edge areas corresponds to the thickest part (t) in the edge areas, in this case. The thickness and the height are measured from the same base line.

Figure 8:
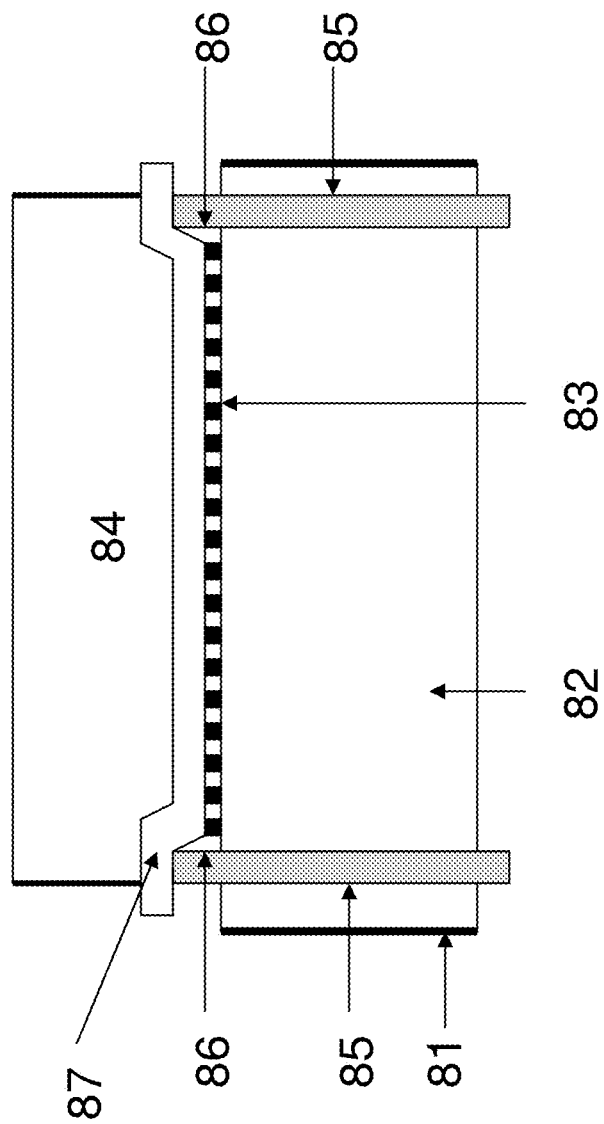
FIG. 8 depicts an embossing assembly used for the manufacture of the film of FIG. 7.

Such a film may be manufactured by an embossing assembly in FIG. 8. As shown, an embossing assembly comprises a drum (81) with an embossing shim (82) tightly secured around the drum. A three-dimensional pattern (83) is on the outside of the assembly. There is a nip roller (84) which is formed of a soft material. The nip roller presses against a substrate layer (87) which may be an electrode layer (e.g., indium tin oxide layer) on a plastic film (e.g., polyethylene terephthalate film) to ensure even distribution of an embossing composition between the substrate (87) and the embossing shim. In order to achieve a film of FIG. 7, a tape (85) is laminated around the embossing shim in the edge areas. The tape preferably has a thickness in the range of about 3 µm to about 10 mm. When the nip roller is pressed against the embossing shim through the substrate layer, a small space (86) at each side is created because the nip roller is soft and therefore deformable against the tape. The embossing composition enters into the spaces (86) and is hardened along with the microstructures, resulting in a film as shown in FIG. 7.

The microstructures referred to in the present application may be microcups as described in U.S. Pat. No. 6,930,818, the content of which is incorporated herein by reference in its entirety. The microcups are filled with a display fluid such as an electrophoretic fluid comprising charged pigment particles dispersed in a solvent or solvent mixture. The filled microcups are then sealed with a sealing layer. The filled and sealed microcups may be sandwiched between two electrode layers to form a display device.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, materials, compositions, processes, process step or steps, to the objective and scope of the present invention. All such modifications are intended to be within the scope of the claims appended hereto.

What is claimed is:

1. An embossing assembly for manufacturing a microstructure film, comprising:
   a) a drum;
   b) an embossing shim tightly wrapped around the drum wherein the embossing shim has a three-dimensional pattern for forming microstructures;
   c) a tape laminated around each end of the embossing shim; and
   d) a deformable nip roller capable of pressing against the tape and the embossing shim to create spaces for an embossing composition to enter to form edge areas.

2. The assembly of claim 1, wherein the microstructure film comprises an area of microstructures and two edge areas, the height of the highest part in each of the edge areas exceeds the height of the highest point in the microstructures, the two edge areas and the microstructures are on opposite sides of the film, and all the heights are measured from the same base line.

3. The assembly of claim 2, wherein, in the microstructure film, the highest part in the edge areas is a spacer line.

4. The assembly of claim 3, wherein the spacer line has a width which is in the range of about 3 µm to about 30 mm.

5. The assembly of claim 2, wherein, in the microstructure film, the height of the highest part in the edge areas exceeds the height of the highest point in the microstructures by about 1µ to about 1 mm.

6. The assembly of claim 5, wherein, in the microstructure film, the height of the highest part in the edge areas is the thickness of the thickest part in the edge areas.

\* \* \* \* \*